United States Patent Office 2,894,870
Patented July 14, 1959

2,894,870

METHOD OF PREPARING OIL FREE SYNERGIZED PYRETHRIN COMPOSITION

Herman Wachs, Baltimore, Md., assignor to Food Machinery and Chemical Corporation, New York, N.Y., a corporation of Delaware No Drawing. Application May 9, 1955
Serial No. 507,176

3 Claims. (Cl. 167—24)

This invention relates to improved insecticidal compositions, and more particularly, to synergized pyrethrins compositions which are stabilized and benefitted by a novel process, and which compositions are characterized herein as "oil free."

Pyrethrum is one of the earliest known insecticides. Ground pyrethrum flowers have been used for many years as powders. During the last three or four decades a large expansion in the use of pyrethrum was brought about by the development of the process whereby the active principles of pyrethrum flowers, called pyrethrins, were extracted from the flowers. This expansion was augmented by the discovery of compounds which are effective synergists for pyrethrins, such as piperonyl butoxide ($\alpha$-[2-(2-butoxyethoxy)ethoxy]4,5-methylenedioxy-2-propyl toluene), sesamin, piperonyl cyclonene, and the like.

Heretofore, in the preparation of such synergized pyrethrins compositions, the synergist is generally added to extracts of pyrethrum flowers dissolved in deodorized kerosene or other base oils, to form a homogeneous solution of pyrethins, synergist, and base oil. The pyrethrum extracts are prepared either by extracting the flowers directly with such an oil, with or without the application of pressure, or, for greater efficiency, first extracting the pyrethrum flowers with a volatile solvent, usually of the hydrocarbon type such as hexane. Then, after treatment of the hexane solution with activated carbon to decolorize and remove resinous impurities, the non-volatile base solvent, usually deodorized kerosene, is added and the volatile solvent is removed, usually in vacuo.

This procedure, although simple, exhibits several serious disadvantages. Pyrethrins are complex, unstable compounds and tend to form solid polymerization products, accompanied by loss of toxicity and decreased solubility in deodorized kerosene. Since a preferred method for applying pyrethrins is from aerosol sprays, whereby the insecticidal solution is discharged under pressure from fine orifices, it is important that the solution be free from precipitated solids which could clog the nozzle openings. Following the above-described extraction procedure, the observed solids content due to polymerized pyrethrins is usually high enough to impair the usefulness of the product in aerosol insecticidal sprays.

Accordingly, this invention has as one of its objects the provision of pyrethrum extracts which are free of insoluble polymerization products.

Another object is to provide synergized pyrethrins compositions of highly improved quality and toxicity.

Another object is to provide a novel method for preparing such compositions which results in an improved product.

A further object is to provide synergized pyrethrins compositions of greatly extended utility.

A still further object is to provide oil free synergized pyrethrins compositions.

A further object is to provide pyrethrins compositions which may be applied from aqueous emulsions.

A still further object is to provide non-phytotoxic synergized pyrethrins compositions.

These and other objects are accomplished according to the present invention by a process involving the following principle: After the pyrethrins are extracted from the pyrethrum flowers with a volatile solvent, but before the volatile solvent is removed, a synergistic compound is added to the solution. This synergistic compound should be a solvent for pyrethrins, and fluid at ordinary temperatures. Upon removal of the volatile solvent there is obtained a solution of the pyrethrum extractives in the synergistic compound, which solution contains no kerosene or other base oil; nor is any other solvent necessary. It marks an important advance in the field of food protection, since it combines all the desirable qualities of pyrethrum and a synergist in a solvent-free form, thus avoiding unnecessary contamination of foods and the danger of flavor reversal. This has resulted in greatly extended utility.

In addition, oil free pyrethrins compositions as prepared by this process are of considerably higher quality than petroleum based pyrethrins. Not only is the extent of pyrethrins polymerization negligible, but the storage stability is significantly increased.

A useful quantitative method for determining the extent of pyrethrins polymerization has been developed by H. Wachs et al., Ind. Eng. Chem., Anal. ed. 16, 453–4 (1944), by measuring the amount of "Freon-insoluble solids" in the pyrethrum extracts. The method is based on the fact that pyrethrins polymerization products are insoluble in Freon (dichlorodifluoromethane), and directly reflects the activity of the pyrethrins solution tested, since polymerized pyrethrins are inactive against insects. Results are expressed as the percentage of the total pyrethrins content which is insoluble in Freon, i.e., percent Freon-insolubles.

Thus a pyrethrum extract containing approximately 14% of pyrethrins, prepared by the heretofore generally used procedure of extraction with hexane, followed by carbon treatment, addition of deodorized base oil and removal of the hexane in vacuo at less than 40° C., forms a hazy rather than a clear solution on dilution with additional base oil, and shows a Freon-insolubles content of about 0.6–1%. This solids content is high enough to affect the ease of spraying from aerosols. On the other hand, when the oil free pyrethrins compositions of this invention are added to deodorized kerosene, completely clear solutions result, with no insoluble residue. The percent Freon-insolubles of such a kerosene solution containing 14% pyrethrins, is about 0.1%. Thus, this new method of preparation avoids the formation of a significant amount of polymer.

These oil free compositions are not only of better quality when first produced than their oil-based analogs, but show remarkable keeping qualities. This has been established by accelerated ageing tests, wherein pyrethrins solutions are heated for prolonged periods, followed by determination of the percent of Freon-insolubles. When a sample of an oil free pyrethrins composition, having an initial Freon-insolubles content of about 0.1%, was heated at 80–85° C. for 107 hours, its Freon-insolubles content showed an increase to 0.2%. In contrast, the Freon-insolubles of a control sample of equal pyrethrins concentration, but dissolved in deodorized base oil, showed an increase from an initial value of 0.6% to a final value of 1.8%. And even after this prolonged heating, the oil free composition could still be completely dissolved in deodorized base oil, while the control sample showed a heavy precipitate on dilution with deodorized base oil.

The explanation for this stability is probably that the new method of preparing these oil free pyrethrins compositions has eliminated or arrested the formation of the partially polymerized pyrethrins which form when the old methods of preparation are used, and which partial polymers are further polymerized on heating to form insoluble high molecular weight polymers.

A preferred method of producing these oil free compositions in accordance with the present invention is as follows:

Ground pyrethrum flowers are extracted exhaustively with a volatile solvent. After partial concentration the solution is agitated with activated carbon until satisfactory decolorization is obtained. The solution of pyrethrins and other pyrethrum extractives (consisting essentially of natural fatty products), is then analyzed for exact pyrethrins content, and a synergist is added to obtain the desired ratio of synergist to pyrethrins in the finished product. Synergistc compounds which are solvents for pyrethrum and which are liquids at ordinary temperatures may be used in the practice of our invention. Among such compounds are piperonyl butoxide. and analogs having the generic formula:

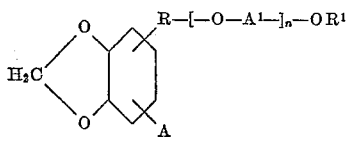

in which R is a saturated, bivalent, aliphatic, hydrocarbon radical, A is a substituent selected from the group consisting of a hydrogen atom and alkyl radicals, $R^1$ is a substituent selected from the group consisting of alkyl, cycloalkyl, aralkyl, aryl and heterocyclic radicals, $A^1$ is a saturated, bivalent, aliphatic, hydrocarbon radical having from two to three carbon atoms and $n$ is an integer from one to three.

Additional synergistic compounds which are solvents for pyrethrins and which may be used in the practice of this invention include N-(2-ethylhexyl)-3,6-endomethylene-4-cyclohexene-1,2-dicarboximide, diallyl phthalate, N-2-ethylhexyl phthalimide, and the like.

Because of its great effectiveness and availability, piperonyl butoxide is at present most commonly used in this application. Piperonyl butoxide exhibits synergism in all proportions with pyrethrins, such that the ratio of these components may be varied over a wide range. For convenience, it is preferred to employ a ratio of about 10 parts of piperonyl butoxide to 1 part of pyrethrins.

After addition of the synergist solvent, the volatile solvent is removed by distillation. Although in general in the presence of the synergist the distillation temperature is not critical, we prefer to distill under vacuo, keeping the still temperature below about 45° C. in the case of piperonyl butoxide. The still may be of the batch or continuous type. It is important to remove all of the volatile solvent; this can be established by determining the flash point of the solvent-free material, which should be substantially above 95° C. for complete removal. The materials of construction of the extractor and the stills should preferably be stainless steel or steel. The use of copper or brass equipment is to be avoided, as it causes discoloration and incipient polymerization of the oil free pyrethrins compositions.

In addition to the valuable and unexpected stability characteristics which are exhibited by oil free pyrethrins compositions, the products have several added advantages which make them particularly desirable for use in certain important fields of insecticide application.

The oil free pyrethrins compositions are applied advantageously from aerosol sprays, showing highly improved behavior over oil based compositions. Aerosols comprise as a propellant a low-boiling solvent such as dichlorodifluoromethane, in which is dissolved the substance to be sprayed. Because of the absence of solid polymerization products, oil free pyrethrins compositions are completely soluble in the propellants, and avoid blocking of the spray nozzles.

In industrial food processing establishments, such as bakeries, meat packing houses, canneries, etc., absence of the petroleum base oils as contained in the presently used pyrethrum extracts makes it possible to use the oil free compositions of this invention safely and without risk of food contamination and flavor reversal. And because these compositions contain no petroleum base solvents, the likelihood of staining walls and fabrics when aerosols are used in dwelling quarters is reduced.

The oil free pyrethrins compositions of this invention are also extremely useful in the grain protectant field. The fact that pyrethrins synergized with piperonyl butoxide are highly effective in the control of insects which attack grain has been known for some time. Insecticidal dusts, prepared by impregnation of organic or inorganic carriers with piperonyl butoxide and a deodorized base oil solution of pyrethrins, have been widely and effectively used on grain. However, this method of application is not only expensive, but is hazardous to the operator, who is exposed to clouds of dust in the process of mixing the dust into the grain. Also, it is necessary to remove carefully all of the insecticide powder prior to using the grain, since the base oil is a potential health hazard.

These oil free pyrethrins compositions make it possible to apply the active ingredients to the grain directly as an aqueous emulsion without causing contamination of the grain with the base oil present in heretofore available pyrethrum extracts, and without the disadvantage of dust clouds during application.

Another field of usefulness of these oil free pyrethrins compositions is in the protection of ornamental and useful plants, where the presently known pyrethrum extracts are objectionable because of the phytocidal properties of the base oils. For this purpose an oil free composition is diluted with an alcohol, such as isopropanol or ethanol, or some other solvent that is relatively volatile and has no phytocidal properties. Oil free pyrethrins compositions may also be effectively applied to plants in the form of aqueous emulsions.

Another use is in the treatment of large seeds, sometimes in combination with suitable fungicides. The emulsifiable form lends itself to the slurry treatment method that is in common use.

Still another use is in the application to growing crops just prior to harvest where rapid kill of insects is desired and where the presence of oil may be objectionable.

The preparation of these synergized oil free compositions is illustrated by the following detailed procedure: Pyrethrum flowers, ground to a mesh size of approximately 60, are conveyed to the top of a vertical continuous countercurrent extractor. A low boiling hydrocarbon solvent, such as hexane, is fed in at the bottom of the extractor at a ratio of about 4 pounds of solvent to 1 pound of flowers. The flowers are moved countercurrently through the hexane and are extruded at the bottom of the extractor, while the hexane containing the pyrethrins overflows at the top of the extractor. This hexane solution, containing approximately 0.35% pyrethrins, is filtered and concentrated in a continuous vacuum evaporator to a concentration of 5% pyrethrins in hexane, the temperature of the solutions being kept below 40° C. during this operation. This concentrated extract is then mixed with activated carbon until a filtered sample has a bright yellow color. At this point the bulk of the extract is filtered, and analyzed for exact pyrethrins content. Piperonyl butoxide is then added, based on this analysis, to obtain a ratio of 10 parts of piperonyl butoxide to 1 part of pyrethrins in the final product. After addition of the piperonyl butoxide, the volatile solvent is distilled in a continuous vacuum evaporator until practically all the hexane is removed, maintaining the still temperature below 45° C. As a final step, the essentially hexane-free residue is brought into a batch vacuum still and kept under high vacuum for about 2 or 3 hours until the last traces of hexane are removed, as shown by the flash point of the remaining material, which should be substantially above 95° C.

The oil free pyrethrins-piperonyl butoxide composition, obtained as a residual product by the above procedure, is a reddish oil with the following average composition and physical properties (approximate values):

Composition (by weight):

75.00% tech. piperonyl butoxide
    7.50% pyrethrins
    17.50% inerts

| | |
|---|---|
| Color value | 15 (Gardner-Holdt). |
| Specific gravity | 1.028 at 20° C./20° C. |
| Weight per gallon | 8.57 lbs. at 20° C. |
| Flash point | Over 95° C. |

Either isopropanol or acetone readily dissolves the active ingredients, causing some precipitation of pyrethrum inerts, which are readily removed by filtration to give a clear solution. The inert ingredients consist solely of other pyrethrum extractives and sometimes a small amount of edible vegetable oil added for standardization. The product is miscible in all proportions with base oils.

Following is an illustration of the use of an oil free pyrethrins composition as a grain protectant: Eighty parts of an oil free composition containing 75% piperonyl butoxide and 7.5% pyrethrins are mixed with 20 parts of an emulsifier such as a polyoxyethylene stearate to give an emulsifiable concentrate containing 60% piperonyl butoxide and 6% pyrethrins. One part of this emulsifiable concentrate is added to 29 parts of water, producing a water emulsion containing 2% piperonyl butoxide and 0.2% pyrethrins. Four to five gallons of this emulsion, evenly applied to 1000 bushels of wheat, maize and other grains, protects them from insect damage for a normal storage period of about 8 months.

Wide variations can be made in the ratio of pyrethrins to synergist, as well as in the dosage or concentration of the final water emulsion. The emulsifying agent should be carefully selected on the basis of complete safety to warm blooded animals.

A satisfactory and safe spray for the control of fruit flies may be prepared from the above-mentioned emulsifiable concentrate containing 60% piperonyl butoxide and 6% pyrethrins by dilution with 1200 parts water.

A typical illustration of the use of these oil free compositions in an aerosol spray for food processing establishments is as follows: An oil free concentrate containing approximately 72% piperonyl butoxide, 9% pyrethrins and 19% other pyrethrum extractives is prepared in accordance with the method previously described. Isopropanol is added to this concentrate to obtain a solution containing 5% pyrethrins and 40% piperonyl butoxide. The addition of isopropanol causes precipitation of a small quantity of pyrethrum waxes which are removed by filtration in the presence of 0.5 to 1% of filter aid. The clear isopropanol solution may be used as such or the isopropanol may be removed by distillation in vacuo, leaving a wax-free oil free composition. Either preparation may be dissolved in a propellant of the Freon type in a pressure container, to give a concentration of 2% piperonyl butoxide and 0.25% pyrethrins. Safe and effective control of insects is obtained when the aerosol is sprayed at the rate of 7.5 mg. of pyrethrins and 60 mg. of piperonyl butoxide per 1000 cu. ft.

The spray may be applied as an emulsion whose particle size may be varied by addition of non-volatile agents such as edible oils, mono- and diglycerides of fatty acids, etc. These additives should be carefully selected on the basis of complete safety to warm blooded animals, so that a basic principle of the present invention is not negated.

To illustrate the application of oil free pyrethrins compositions to plants, where the use of presently known pyrethrum extracts is objectionable because of the phytocidal properties of the base oils: An oil free composition containing 75% piperonyl butoxide and 7.5% pyrethrins is diluted with a non-phytocidal, relatively volatile solvent, such as isopropanol or ethanol, to a concentration of 10% piperonyl butoxide and 1% pyrethrins. The solution is filtered if necessary, and filled into pressure containers. To 20 parts of the above solution there is added under pressure 80 parts of a propellant of the Freon type to obtain a highly non-phytocidal plant insecticide spray.

Another means of applying the oil free compositions of this invention for the protection of plants is in the form of aqueous emulsions. Such an emulsion may be prepared in the following manner: 80 parts of an oil free composition containing 75% piperonyl butoxide and 7.5% pyrethrins are mixed with 20 parts of an emulsifier such as a polyoxyethylene stearate. 1 part of this emulsion concentrate is added to 199 parts of water and applied as a spray for beans, crucifers and cucurbits at the rate of 100 gallons per acre. Excellent control of insects without damage to the plants is thus obtained.

It is apparent that this invention provides new and improved synergized insecticidal compositions having superior properties and enhanced utility, due to the elimination of the need for deodorized kerosene or other oils in the process or product. The details of the novel process and characteristics of the product have been described, and specific examples have illustrated the extensive usefulness of these oil free synergized pyrethrins compositions in aqueous and other non-phytocidal systems. Moreover, it is contemplated that mixtures of various insecticide toxicants and synergistic compounds may be compounded with our oil free compositions, and the invention is not to be restricted to the specific cases herein described.

Pursuant to the requirements of the patent statutes, the principle of this invention has been explained, and exemplified in a manner so that it can be readily practiced by those skilled in the art, such exemplification including what is considered to represent the best embodiment of the invention. However, it should be clearly understood that, within the scope of the appended claims, the invention may be practiced by those skilled in the art, and having the benefit of this disclosure, otherwise than as specifically described and exemplified herein.

That which is claimed as patentably novel is:

1. A method of preparing an insecticidal composition comprising pyrethrins dissolved in a synergist therefor, comprising: extracting pyrethrins from pyrethrum with a volatile solvent; adding to the extract so obtained a synergist which is a non-volatile solvent for pyrethrins and has the generic formula:

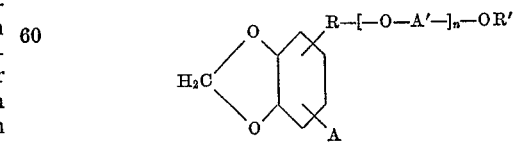

in which R is a saturated, bivalent, aliphatic, hydrocarbon radical, A is a substituent selected from the group consisting of a hydrogen atom and alkyl radicals, R' is a substituent selected from the group consisting of alkyl, cycloalkyl, aralkyl, aryl and heterocyclic radicals, A' is a saturated, bivalent, aliphatic, hydrocarbon radical having from two to three carbon atoms and $n$ is an integer from one to three; and subsequently removing the volatile solvent from the solution of pyrethrins in said synergist.

2. The method of claim 1, wherein the synergist for pyrethrins is piperonyl butoxide.

3. The method of claim 1, wherein the volatile solvent is a hydrocarbon solvent.

References Cited in the file of this patent

UNITED STATES PATENTS

| | | |
|---|---|---|
| 2,358,392 | Goodhue | Sept. 19, 1944 |
| 2,421,569 | La Forge | June 3, 1947 |

FOREIGN PATENTS

| | | |
|---|---|---|
| 656,058 | Great Britain | Aug. 8, 1951 |

OTHER REFERENCES

Gnadinger et al.: "Manuf. of Concentrated Pyrethrum Extract," Ind. and Eng. Chem., vol. 24, No. 9 (1932), pp. 988–991.